(12) United States Patent
Karlsson

(10) Patent No.: US 6,386,184 B1
(45) Date of Patent: May 14, 2002

(54) INTERNAL COMBUSTION ENGINE COMPRISING AT LEAST ONE CYLINDER AND INDIVIDUAL INTAKE PASSAGES

(75) Inventor: Jan Karlsson, Vastra Frolunda (SE)

(73) Assignee: AB Volvo, Gothenburg (SE)

( * ) Notice: Subject to any disclaimer, the term of this patent is extended or adjusted under 35 U.S.C. 154(b) by 0 days.

(21) Appl. No.: 09/555,056
(22) PCT Filed: Nov. 24, 1998
(86) PCT No.: PCT/SE98/02130
§ 371 Date: Sep. 18, 2000
§ 102(e) Date: Sep. 18, 2000
(87) PCT Pub. No.: WO99/30015
PCT Pub. Date: Jun. 17, 1999

(30) Foreign Application Priority Data

Nov. 24, 1997 (SE) .............................................. 9704302

(51) Int. Cl.⁷ ................................................. F02B 15/00
(52) U.S. Cl. .................................. 123/432; 123/184.55
(58) Field of Search ........................... 123/432, 184.55, 123/184.56, 184.53

(56) References Cited

U.S. PATENT DOCUMENTS 5,269,270 A * 12/1993 Suzuki et al. ............... 123/432
5,535,710 A * 7/1996 Zoschke et al. ............. 123/432
5,696,318 A * 12/1997 Ernst et al. .................. 123/432
5,765,525 A * 6/1998 Ma .............................. 123/432

FOREIGN PATENT DOCUMENTS

| DE | 27 22 301 | 12/1977 |
| DE | 35 02 699 | 8/1985 |
| DE | 41 11 153 | 10/1992 |
| JP | 61-104120 | 5/1986 |
| JP | 1-170717 | 7/1989 |

* cited by examiner

*Primary Examiner*—John Kwon
(74) *Attorney, Agent, or Firm*—Young & Thompson

(57) ABSTRACT

An internal combustion engine (1) which comprises at least one cylinder (3), at least two suction valves (4, 5) per cylinder (3), and individual suction channels (6, 7) of longer and shorter length for each cylinder (3). Each suction channel (6, 7) communicates with a suction valve (4, 5) respectively. At least two of the suction valves (4, 5) have different closing times in order to increase the air quantity sucked into the cylinder (3), and thereby increase the torque and power of the internal combustion engine (1). According to one embodiment, a throttle can be arranged in each suction channel (6, 7) and the shorter suction channel (6) can be provided with a smaller area of cross section than the longer suction channel (7).

17 Claims, 7 Drawing Sheets

Figure 1:
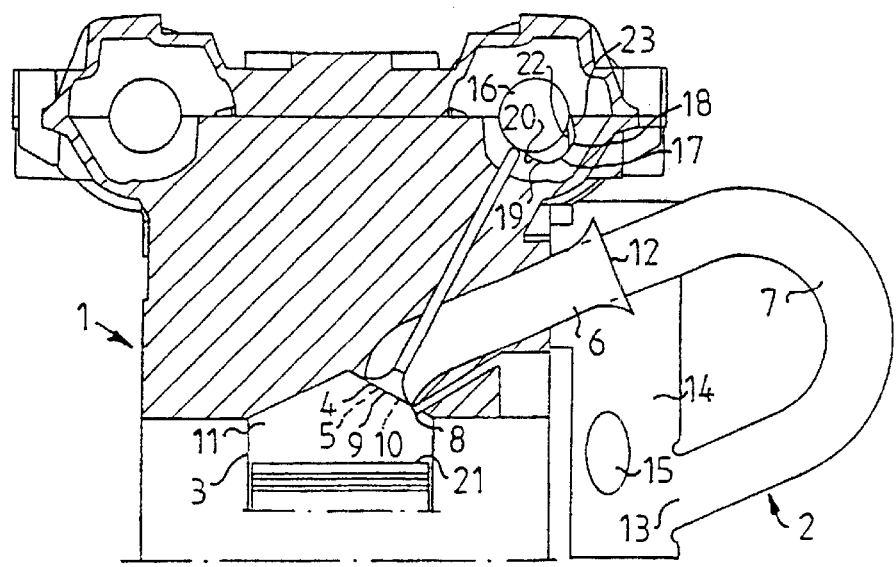

INTERNAL COMBUSTION ENGINE COMPRISING AT LEAST ONE CYLINDER AND INDIVIDUAL INTAKE PASSAGES

The present invention relates to an internal combustion engine which comprises at least one cylinder, at least two suction valves per cylinder, and individual suction channels of longer and shorter length for each cylinder, each suction channel communicating with a suction valve.

During the suction stroke of a piston engine, it is desirable for as large mass of air as possible to be delivered to the cylinder space. For this reason it is usual for each cylinder to be provided with several suction valves and suction channels. When the suction valves are opened, air flows through the suction channels and into the cylinder space. A low-pressure wave then propagates in the suction channels in the direction from the cylinder space. When the low-pressure wave reaches an open end of the respective suction channel, a high-pressure wave is formed which flows in the direction towards the cylinder space. By arranging the suction channels with different lengths, the high-pressure wave in the respective suction channel reaches the cylinder space at different times. If one or more of the suction channels are provided with a length which is adapted so that the high-pressure wave reaches the cylinder space at the end of the suction stroke or the start of the compression stroke, the quantity of air in the cylinder space can be increased.

From U.S. Pat. No. 5,009,200 it is already known to provide an internal combustion engine with a suction arrangement in which the suction channels to the respective suction valve have different lengths. At a low engine speed, only the longest suction channel is open, while the shorter ones are closed with the aid of throttles. As the engine speed increases, the throttle in one of the short suction channels is opened, at the same time as the effective length of the long suction channel is shortened by means of a side throttle belonging to this channel being opened. At high engine speeds, all the throttles of the suction channels are opened, at the same time as the effective length of the longer suction channels is shortened by means of side throttles so that the effective length of all the suction channels is identical.

A disadvantage of this suction arrangement is the large number of throttles required for the suction arrangement to function. This suction arrangement therefore requires a large number of moving components and a special control arrangement for controlling the throttles.

One object of the present invention is to make available an internal combustion engine of the type set out in the introduction, which comprises a small number of components specially intended to control the suction of air for the purpose of increasing the torque and power of the internal combustion engine.

Another object of the invention is to make available an internal combustion engine in which the components which are specially intended to control the suction of air occupy a small space.

According to the invention, this is achieved by means of at least two of the suction valves having different closing times.

In such an internal combustion engine, there is no requirement for separate throttles which open and close the suction channels. Instead, the suction valves of the internal combustion engine are used to open and close the suction channels at defined points in time. As a result of this, the suction arrangement takes up a small amount of space.

Figure 4:
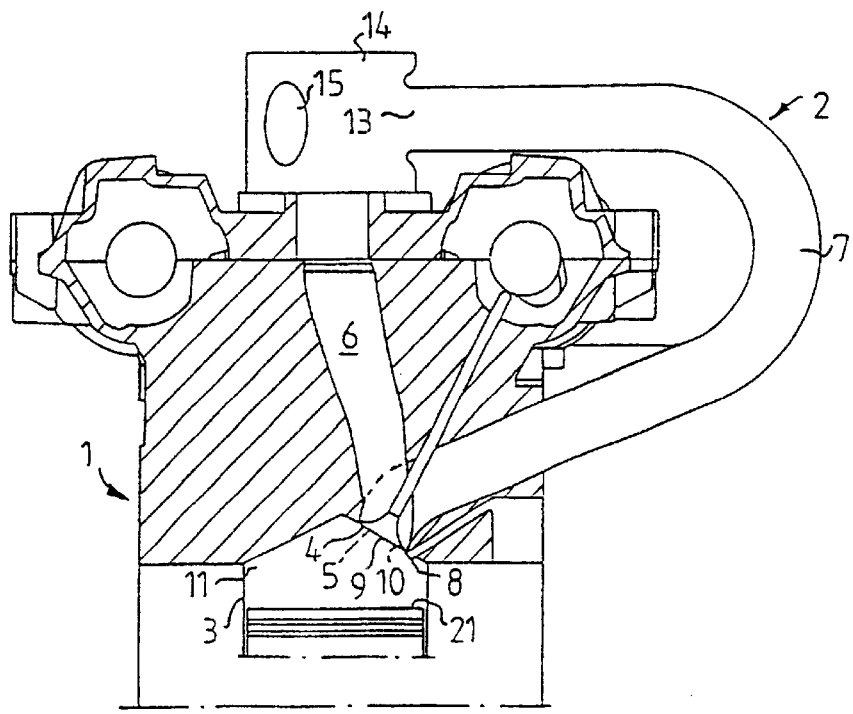
Figure 2:
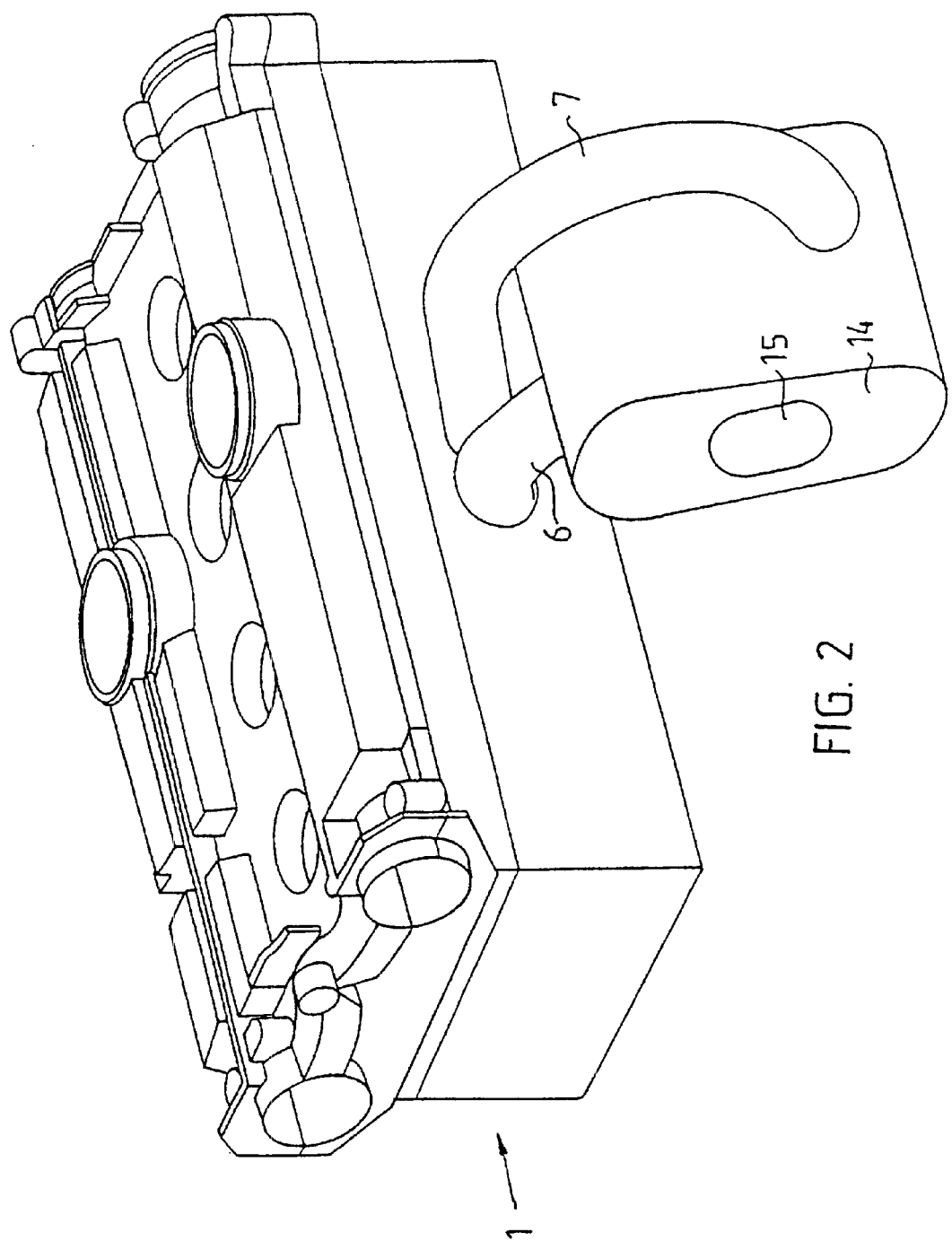
Figure 3:
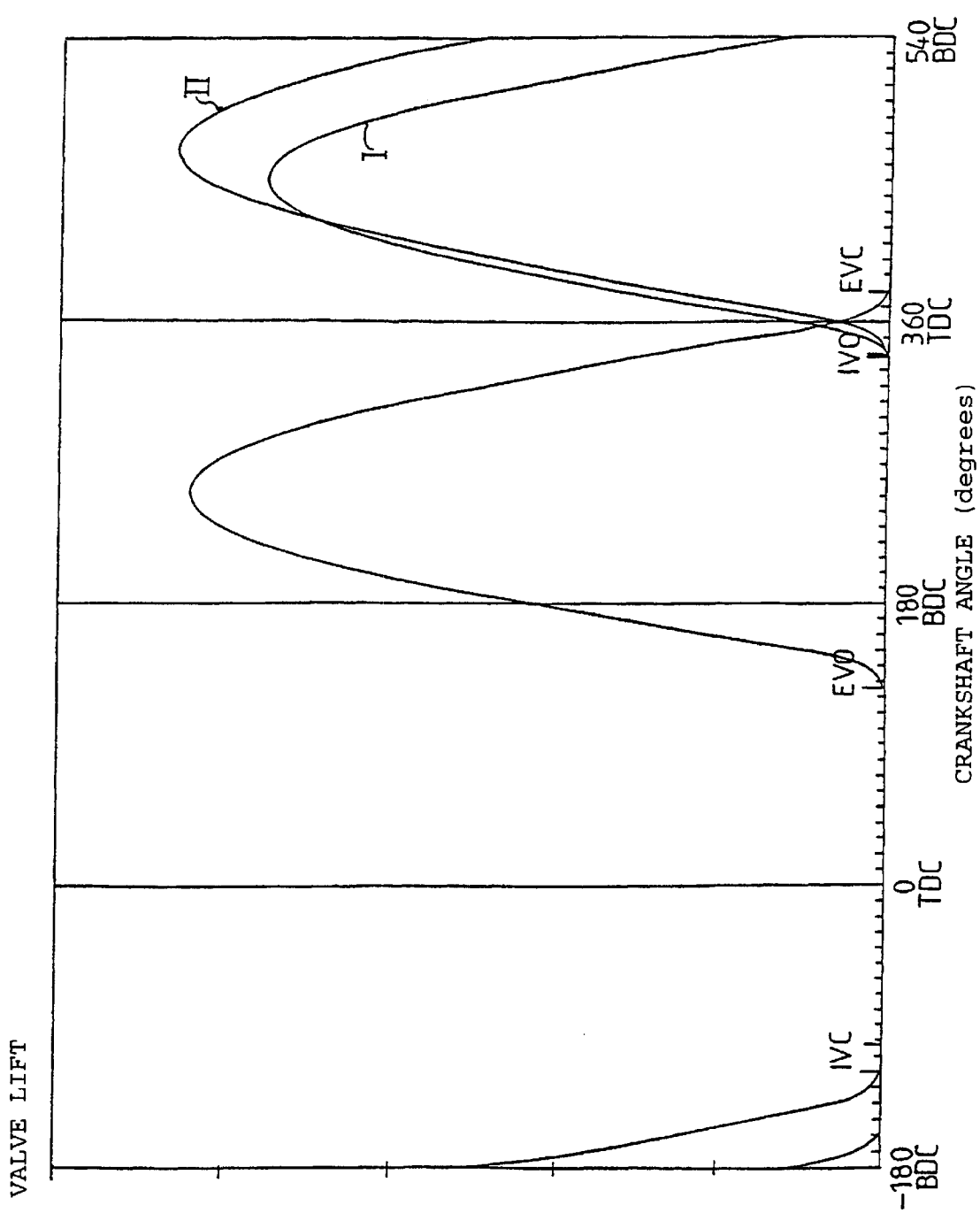
Figure 5:
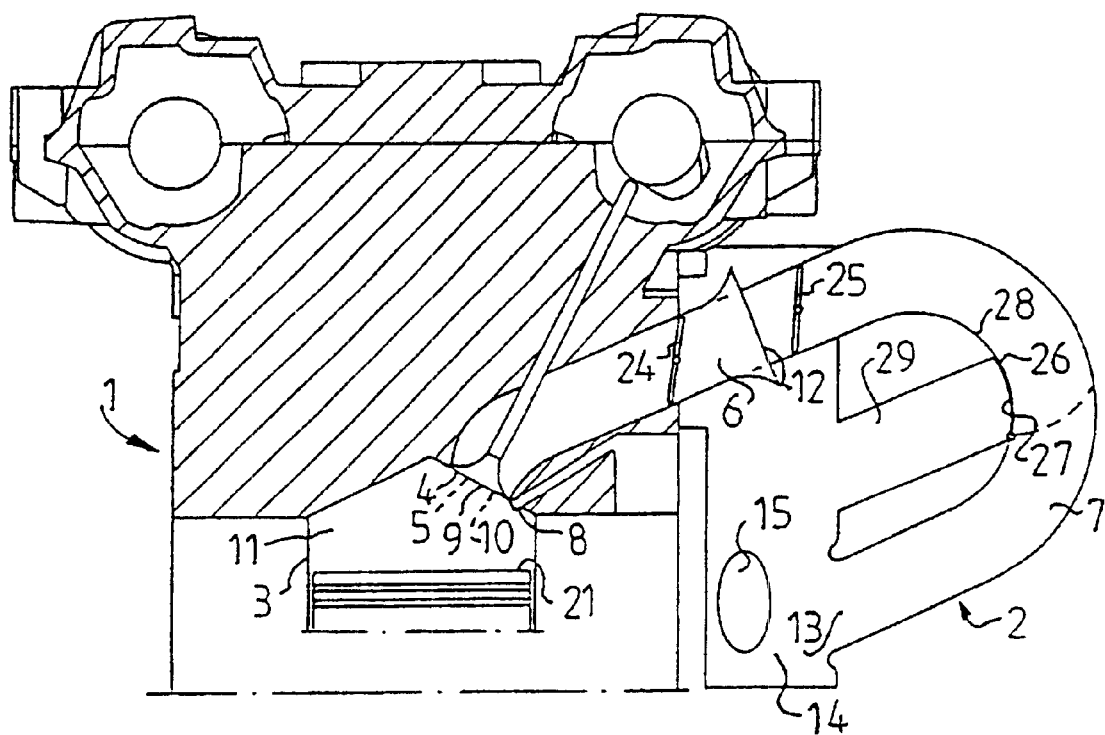
Figure 6:
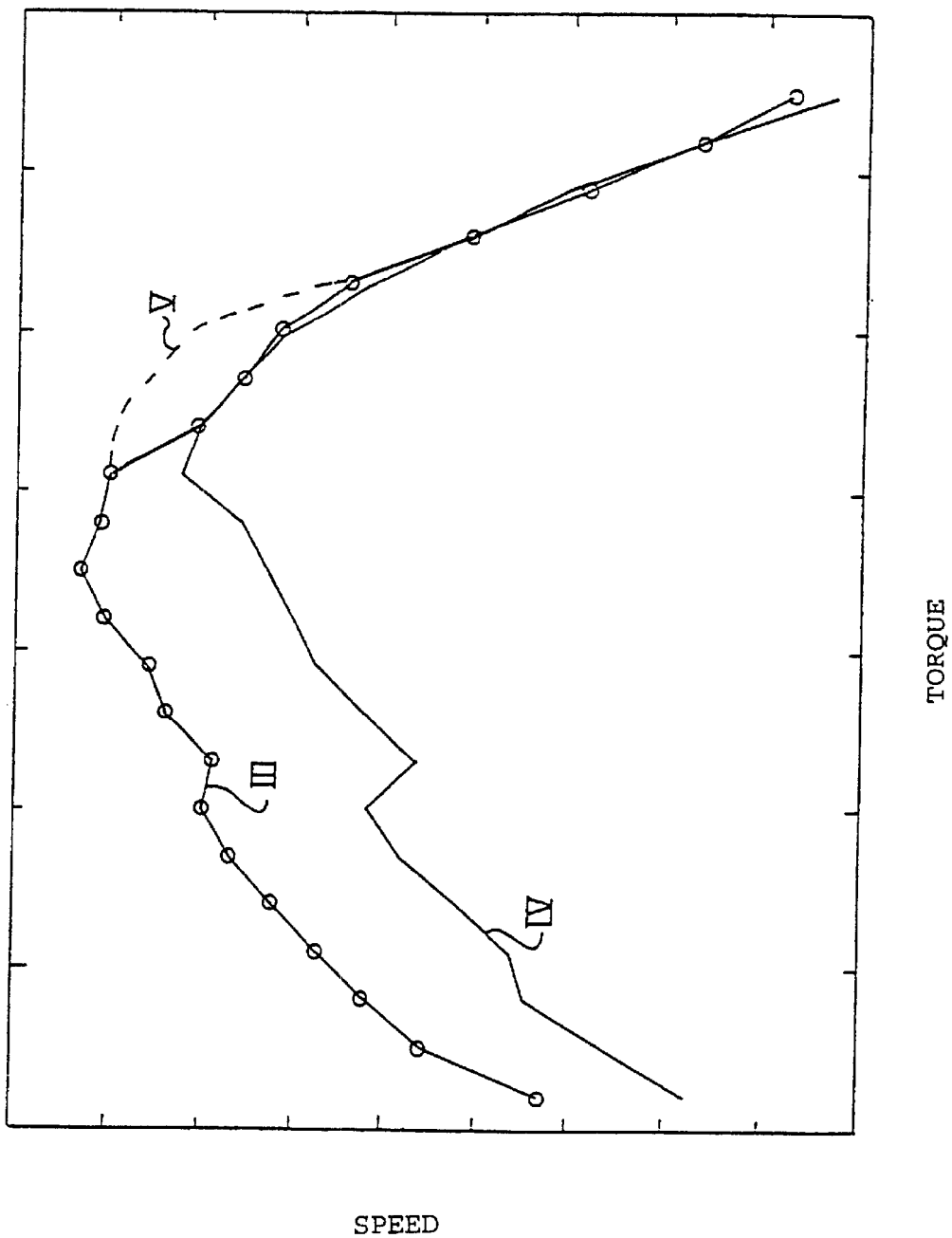
Figure 7:
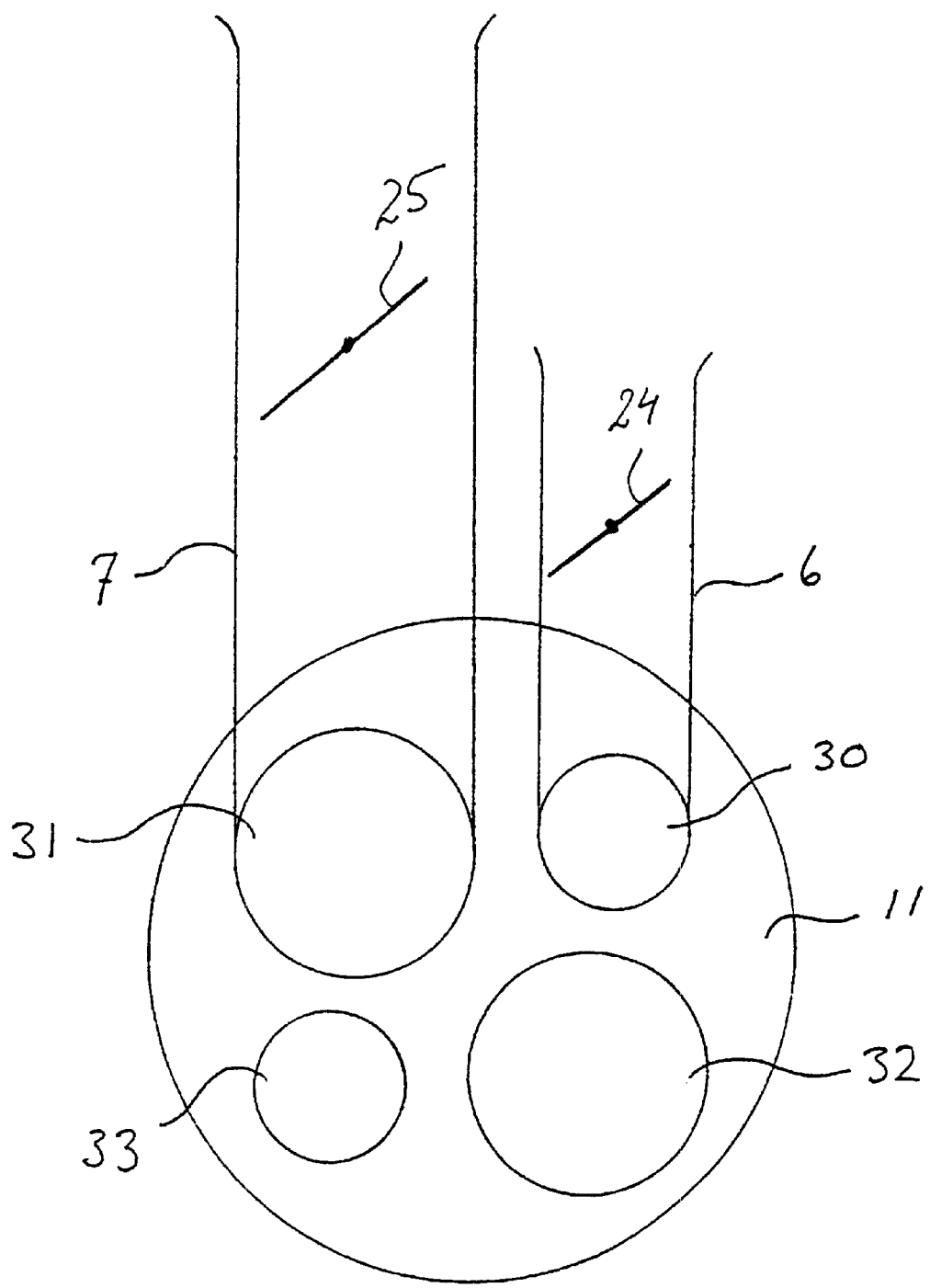
Figure 8:
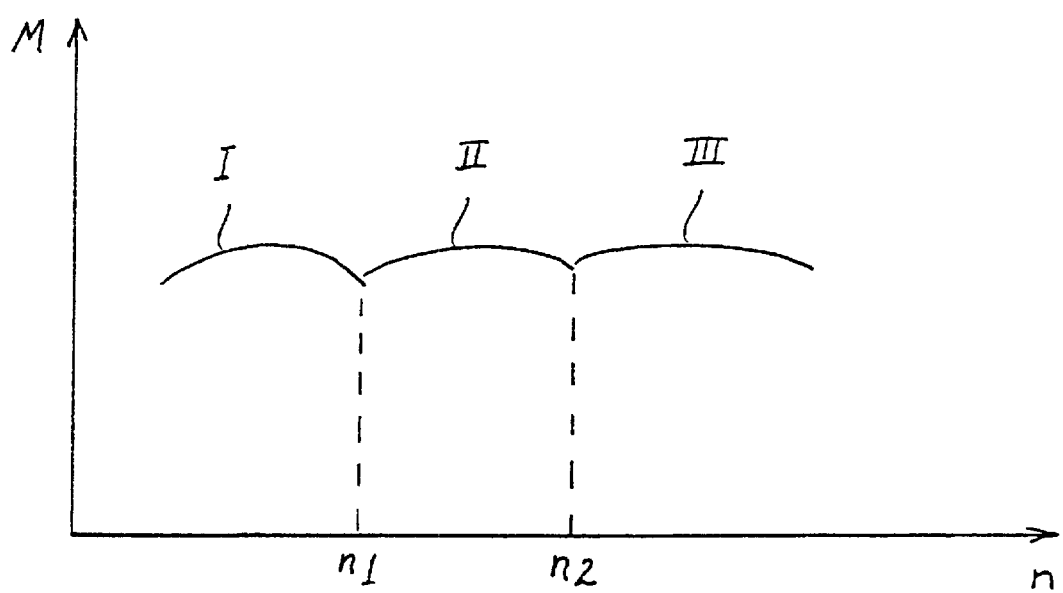

The invention will be explained in greater detail below with reference to the embodiments shown in the attached drawings, where:

FIG. 1 shows a first embodiment of an internal combustion engine according to the invention, FIG. 2 shows a perspective view of the internal combustion engine according to the first embodiment, FIG. 3 shows a valve lift diagram for an internal combustion engine according to the invention, FIG. 4 shows a second embodiment of an internal combustion engine according to the invention, FIG. 5 shows a third embodiment of an internal combustion engine according to the invention, FIG. 6 shows a torque curve for an internal combustion engine according to the invention and a torque curve for a conventional internal combustion engine, FIG. 7 shows a fourth embodiment of an internal combustion engine according to the invention, and FIG. 8 shows a torque curve for an internal combustion engine according to the fourth embodiment.

An internal combustion engine 1 according to a first embodiment is shown in FIG. 1. The internal combustion engine 1 preferably comprises several cylinders 3, and each cylinder 3 comprises at least two suction valves 4, 5. The invention can be applied, however, to a single-cylinder internal combustion engine. A suction arrangement 2 of the internal combustion engine 1 comprises individual suction channels 6, 7 of longer and shorter length for each cylinder 3. According to the embodiment in FIG. 1, the suction arrangement 2 comprises a first and a second suction channel 6, 7 respectively, which communicate with a first and a second suction valve 4, respectively. The first suction channel 6 is shorter than the second suction channel 7.

The first and second suction channels 6, 7 are situated alongside each other, as is shown more clearly in a diagrammatic perspective view in FIG. 2. The first and second suction channels 6, 7 extend essentially parallel to each other in an oblique direction towards the respective first and second suction valves 4, 5. An injection valve 8 for fuel can be arranged between the first and second suction channels 6, 7. The first and second suction channels 6, 7 have a first end 9 and 10, respectively, which opens into the cylinder space 11 of the cylinder 3. The first end 9, 10 of the respective suction channel 6, 7 can be opened and closed by means of the first and second suction valves 4, 5 respectively. The first and second suction channels 6, 7 also have a second end 12, 13, respectively, which opens into a collecting area 14. The collecting area 14 communicates with an air inlet opening 15 in which an air filter (not shown) can be located. When the engine 1 is running, air is sucked in through the air inlet opening 15 to the collecting area 14 and onwards through the first and second suction channels 6, 7 to the cylinder space 11.

At the start of the suction stroke or at the end of the exhaust stroke, the first and second suction valves 4, 5 open simultaneously. This can be achieved by means of a camshaft 16 controlling the opening and closing time of the suction valves 4, 5 and having cams 17 and 18 which act on the valves 4 and 5, respectively. For the suction valves 4 and 5 to open simultaneously, the cams 17 and 18 have opening flanks 19 and 20, respectively, which are essentially of identical shape. However, it is conceivable for the first and second suction valves 4 and 5 to be opened at different times.

When the suction valves 4 and 5 open, a low-pressure wave first spreads from the cylinder space 11 and onwards to the first end of the respective suction channel 6, 7 in the direction of the collecting area 14. The low-pressure wave which propagates in the first suction channel 6 reaches the collecting area 14 before the low-pressure wave propagating in the second suction channel 7 since the first suction channel 6 is shorter than the second suction channel 7.

When the low-pressure wave in the first suction channel 6 reaches the second end 12 of the first suction channel 6, the low-pressure wave reverses and instead forms a high-pressure wave. It has long been known that when a low-pressure wave reaches an open pipe end, the wave reverses and changes from negative to positive pressure, that is to say a high-pressure wave is formed. The high-pressure wave in the first suction channel 6 thus propagates in the direction towards the first end of the first suction channel 6 and onwards into the cylinder space 11. At the same time, the low-pressure wave propagates in the second suction channel 7 and reverses when it reaches the second end 13 of the suction channel 7.

When the low-pressure wave in the second suction channel 7, that is to say the longer suction channel 7, has reversed and is propagating in the form of a high-pressure wave in the direction towards the cylinder space 11, the piston 21 in the cylinder 3 approaches the lower dead point (not shown), after which the compression stroke is intended to commence. Before the high-pressure wave reaches the cylinder space 11, the first suction valve 4 is closed and, consequently, the first suction channel 6 is closed. This is achieved by means of the cam 17 which controls the first suction valve 4 having a shape which interrupts the opening of the first suction valve 4 earlier than the cam 18 for the second suction valve 5. The closing flank 22 of the cam 17 for the first suction valve 4 is thus displaced on the cam-shaft 16 compared to the closing flank 23 of the cam 18 for the second suction valve 5. One reason why the first suction valve 4 must be closed before the high-pressure wave in the second suction channel 7 reaches the cylinder space 11 is that suction air must not flow out through the first suction channel 6 when the high-pressure wave in the second suction channel 7 reaches the cylinder space 11.

The first suction valve 4 is thus closed and the second suction valve 5 is open when the high-pressure wave in the second suction channel 7 reaches the cylinder space 11. To ensure that as much air as possible will flow into the cylinder space 11, the second suction valve 5 is closed after the compression stroke has commenced.

As was mentioned above, this is represented in diagrammatic form in the valve lift diagram according to FIG. 3. The position of the first suction valve 4 is represented by the continuous line I in FIG. 3, and the position of the second suction valve 5 is represented by the continuous line II. At the end of the exhaust stroke, the first and second suction valves 4 and 5 are opened simultaneously. According to the illustrative embodiment shown in FIG. 3, this takes place approximately at a crankshaft angle of 340 degrees. Thereafter, the suction valves 4 and 5 are opened essentially identically until a crankshaft angle of approximately 450 degrees is reached, after which the first suction valve 4 begins to close. The first suction valve 4 is fully closed at a crankshaft angle of approximately −160 degrees. It should be noted that the second suction valve 5 is still open at this point for the reasons which have been explained hereinabove. The second suction valve 5 is fully closed at a crankshaft angle of approximately −120 degrees. For reasons of clarity, it should be noted that at the upper dead point, when the expansion stroke begins, the crankshaft (not shown) of the engine 1 is at an angle of zero degrees.

An internal combustion engine 1 with a suction arrangement 2 according to a second embodiment is shown in FIG. 4. Instead of both the first and second suction channels 6 and 7 running parallel with each other towards the cylinder space 11, as in the first embodiment according to FIG. 1, the first suction channel 6 runs in a direction from the top of the internal combustion engine 1 down towards the cylinder space 11. The second suction channel 7 runs in an oblique, sloping direction towards the cylinder space 11. The first suction channel 6 is shorter than the second suction channel 7. The suction channels 6 and 7 open into a collecting area 14 which is arranged on the top of the internal combustion engine. The suction arrangement 2 according to this second embodiment allows sufficient space for an injection valve 8 for fuel to be placed beside the second suction channel 7.

According to a third embodiment, which is shown in FIG. 5, a throttle 24, 25 can be arranged in the first and/or second suction channel 6, 7, respectively. The throttle 24, 25 can be closed or opened for different modes of operation of the internal combustion engine 1 in order to provide optimum running of the internal combustion engine 1. For example, the throttle 25 in the second, long suction channel 7 can be closed and the throttle 24 in the first, short suction channel 6 can be opened at low speeds of the internal combustion engine 1 for the purpose of creating an air vortex in the cylinder space 11 and thereby providing a better mix between air and fuel.

The length of the first and second suction channels 6 and 7 is preferably fixed, but it is conceivable for the length of the second suction channel 7 to be regulated, for example by means of a side throttle 26 which is arranged in a side opening 27 in the wall 28 of the second suction channel 7. A side channel 29 is arranged between the side opening 27 in the wall 28 of the second suction channel 7 and the collecting area 14. When the side throttle 26 is opened, it simultaneously closes off part of the second suction channel 7. The distance by which the suction air travels in the second suction channel 7 is then made shorter. By opening the side throttle 26 when the internal combustion engine 1 is working at high speeds, an increase in torque and power can be achieved since the high-pressure wave is then given time to reach the cylinder space 11 before the second suction valve 5 is closed.

FIG. 6 shows a torque curve for an internal combustion engine 1 with a suction arrangement 2 according to the invention, and a torque curve for an internal combustion engine 1 with a conventional suction arrangement. The continuous curve III which is provided with rings represents the torque curve for an internal combustion engine 1 with a suction arrangement 2 according to the invention. The continuous curve IV without rings represents the torque curve for an internal combustion engine 1 with a conventional suction arrangement. At speeds of up to approximately 5000 rpm, the internal combustion engine 1 with a suction arrangement 2 according to the invention gives a torque which is higher than in the internal combustion engine 1 with a conventional suction arrangement. At speeds of over 5000 rpm, the torque of the two engines 1 is essentially identical. This is explained by the fact that the high-pressure wave in the second, longer suction channel 7 does not have time to reach the cylinder space 11 before the second suction valve 5 closes. By providing the second suction channel 7 with a side throttle 26, as has been described above, which opens at approximately 5000 rpm, a torque increase is achieved which is represented by the broken line curve V.

It is also conceivable to provide the first and second suction channels 6 and 7 with different areas of cross section. Since the first, short suction channel 6 has a greater quantity of air flowing through it than does the second, long suction channel 7 on filling of the cylinder space 11, it is expedient for the first suction channel 6 to be provided with a greater area of cross section than the second suction channel 7. The main task of the second suction channel 7 is to introduce a quantity of air under increased pressure at the end of the suction stroke or the start of the compression stroke.

It is also conceivable to design the first, short suction channel 6 with a smaller area of cross section than the second, long suction channel 7, as is shown according to a fourth embodiment in FIG. 7. FIG. 7 shows a cylinder diagrammatically from above. According to this embodiment, the first and second suction channels 6 and 7 are each provided with a throttle 24 and 25, respectively. By closing and opening the throttles 24, 25 at certain predetermined speeds n, an advantageous torque curve for the internal combustion engine 1 can be obtained, as is shown in FIG. 8. In FIG. 8, the horizontal axis represents speed n and the vertical axis represents torque M.

At low speeds of the engine 1, the throttle 25 in the second suction channel 7 is closed so that only the first suction channel 6 is open. The torque M of the engine 1 then follows the curve section I in FIG. 8. When the speed n of the engine 1 increases, the throttle 24 in the first suction channel 6 will close, at a predetermined speed n1, and the throttle 25 in the second suction channel 7 will open. The torque M of the engine 1 then follows the curve section II in FIG. 8. At a predetermined speed n2, the throttle 24 in the first suction channel 6 will open again and the throttle 25 in the second suction channel 7 will remain open, so that air to the internal combustion engine 1 can flow through both the first and second suction channels 6, 7. The torque M of the engine 1 then follows the curve section III in FIG. 8. An even torque curve is thus obtained, with a high torque M across a wide speed range.

By designing the valve openings 30, 31 for the first and second suction channels 6, 7 with different sizes and at the same time designing the openings 32, 33 of the exhaust valves with different sizes, as large as possible an area of the top surface of the cylinder space 11 can be utilized, as is shown in FIG. 7.

The suction arrangement 2 according to the invention can advantageously be used in an internal combustion engine 1 with spark ignition, which is provided with carburettor, direct fuel injection in one or more suction pipes or direct fuel injection in the cylinder space. The suction arrangement according to the invention can also be used in a diesel engine.

Instead of using a camshaft 16 with cams 17 and 18, other control members for the valves 4 and 5 can be used. For example, each valve can be provided with an individual control member where the opening and closing time can be regulated.

The embodiments which are described above concern an internal combustion engine 1 with two suction valves 4 and 5 and two suction channels 6 and 7 per cylinder 3. However, the present invention can include more than two suction valves 4, 5 and suction channels 6, 7 per cylinder 3. For example, three suction valves and three suction channels can be arranged per cylinder 3. The three suction channels can then have different lengths, or two of the three suction channels can have the same length.

In order to further increase the torque and power of the internal combustion engine 1, an exhaust gas turbine or a mechanical compressor can be connected to the suction arrangement 2.

What is claimed is:

1. Internal combustion engine (1) which comprises at least one cylinder (3), at least two suction valves (4, 5) per cylinder (3), and individual suction channels (6, 7) of longer and shorter length for each cylinder (3), each suction channel (6, 7) communicating with a suction valve (4, 5) respectively, and at least two of the suction valves (4, 5) have different closing times, characterized in that one suction valve (4) which communicates with a shorter suction channel (6) closes earlier than another suction valve (5) which communicates with a longer suction channel (7), so that suction air which reaches the cylinder space (11) is prevented to flow out through the first suction channel (6) when a high-pressure wave (7) reaches the cylinder space (11).

2. Internal combustion engine according to claim 1, characterized in that the number of suction channels (6, 7) is two, thus comprising a first and shorter suction channel (6) and a second and longer suction channel (7), which communicate with first and second suction valves (4, 5) respectively.

3. Internal combustion engine according to claim 2, characterized in that the first suction valve (4) for the first and shorter suction channel (6) closes earlier than the second suction valve (5) for the second and longer suction channel (7).

4. Internal combustion engine according to claim 2, characterized in that the first and second suction channels (6, 7) are situated alongside each other and extend essentially parallel to each other from one side of the internal combustion engine (1) in an oblique direction towards the respective first and second suction valves (4, 5).

5. Internal combustion engine according to claim 2, characterized in that the first suction channel (6) runs in a direction from the top side of the internal combustion engine (1) downwards to the first suction valve (4), and in that the second suction channel (7) extends from one side of the internal combustion engine (1) in an oblique, sloping direction towards the second suction valve (5).

6. Internal combustion engine according to claim 2, characterized in that the first suction channel (6) has a smaller area of cross section than the second suction channel (7).

7. Internal combustion engine according to claim 2, characterized in that the first suction channel (6) has a greater area of cross section than the second suction channel (7).

8. Internal combustion engine according to claim 2, characterized in that a throttle (24, 25) is arranged in at least one said suction channel (6, 7) in order to regulate the flow of air in said at least one suction channel (6, 7).

9. Internal combustion engine according to claim 2, characterized in that a side throttle (26) is arranged in a side opening (27) in a wall of the second suction channel (7), which side throttle (26) allows air to flow through a side channel (29) which communicates with the collecting area (14).

10. Internal combustion engine according to claim 1, characterized in that the closing times of the suction valves (4, 5) are controlled by means of a camshaft (16) which is arranged in the internal combustion engine (1) and which, with cams (17, 18) of different shapes, cooperates with the suction valves (4, 5) respectively.

11. Internal combustion engine according to claim 1, characterized in that each individual suction channel (6, 7) opens into a common collecting area (14) which is provided with an inlet opening (15) for air.

12. Internal combustion engine according to claim 3, characterized in that the first and second suction channels (6, 7) are situated alongside each other and extend essentially parallel to each other from one side of the internal combustion engine (1) in an oblique direction towards the respective first and second suction valves (4, 5).

13. Internal combustion engine according to claim 3, characterized in that the first suction channel (6) runs in a direction from the top side of the internal combustion engine (1) downwards to the first suction valve (4), and in that the second suction channel (7) extends from one side of the internal combustion engine (1) in an oblique, sloping direction towards the second suction valve (5).

14. Internal combustion engine according to claim 3, characterized in that the first suction channel (6) has a smaller area of cross section than the second suction channel (7).

15. Internal combustion engine according to claim 3, characterized in that the first suction channel (6) has a greater area of cross section than the second suction channel (7).

16. Internal combustion engine according to claim 3, characterized in that a throttle (24, 25) is arranged in at least one said suction channel (6, 7) in order to regulate the flow of air in said at least one suction channel (6, 7).

17. Internal combustion engine according to claim 3, characterized in that a side throttle (26) is arranged in a side opening (27) in a wall of the second suction channel (7), which side throttle (26) allows air to flow through a side channel (29) which communicates with the collecting area (14).

* * * * *